May 30, 1961 C. E. FERREIRA ET AL 2,986,199
ADJUSTABLE VEHICLE SEAT SUSPENSION
Filed Nov. 4, 1959 3 Sheets-Sheet 1

INVENTORS.
Charles E. Ferreira
Anthony Ferreira
BY
William J. Ruano
ATTORNEY.

May 30, 1961  C. E. FERREIRA ET AL  2,986,199
ADJUSTABLE VEHICLE SEAT SUSPENSION

Filed Nov. 4, 1959  3 Sheets-Sheet 3

INVENTORS
Charles E. Ferreira &
BY Anthony Ferreira

ATTORNEY

United States Patent Office 2,986,199
Patented May 30, 1961

2,986,199
ADJUSTABLE VEHICLE SEAT SUSPENSION

Charles E. Ferreira and Anthony Ferreira, Topton, Pa., assignors to General Seating Company, Topton, Pa.

Filed Nov. 4, 1959, Ser. No. 850,833

1 Claim. (Cl. 155—9)

This invention relates generally to vehicle seats and more particularly, to a vehicle seat suspension for trucks, tractors, busses or passenger vehicles which has an adjustable, torsion spring mounting for selectively providing softer or harder riding characteristics—also which has fore and aft adjustment to suit drivers or different size.

An outstanding disadvantage of conventionally used, spring mounted vehicle seats is that they are somewhat complicated in construction; furthermore, they do not give a desirable type of motion to the seat, and instead, permit undeirable fore and aft movement of the seat as a consequence of jolts or of adjustment. Furthermore, they do not provide a simple and effective way of selectively adjusting the tension of the support spring.

An object of the present invention is to provide a torsion spring-mounted seat, for vehicles or other conveyances, which is of readily adjustable construction and which enables a wide range of adjustment to provide either a softer or harder ride and to compensate for different weights of drivers, so as to reduce driver's fatigue to a minimum, also which is adjustable in a fore and aft direction.

A further object of our invention is to provide a yieldable seat for vehicles, which seat has parallel motion, without lateral or fore and aft motion when moved vertically by jolts of the vehicle, also which seat can be mounted to slide forwardly or rearwardly to suit different sized legs of different drivers.

A still further object of the invention is to provide an adjusatbly tensioned torsion spring for a vehicle seat in which the lever arms are designed and arranged so as to give maximum travel with minimum height of the unit.

Other objects and advantages of the invention will become apparent from a study of the following description taken with the accompanying drawings wherein.

Figure 1:
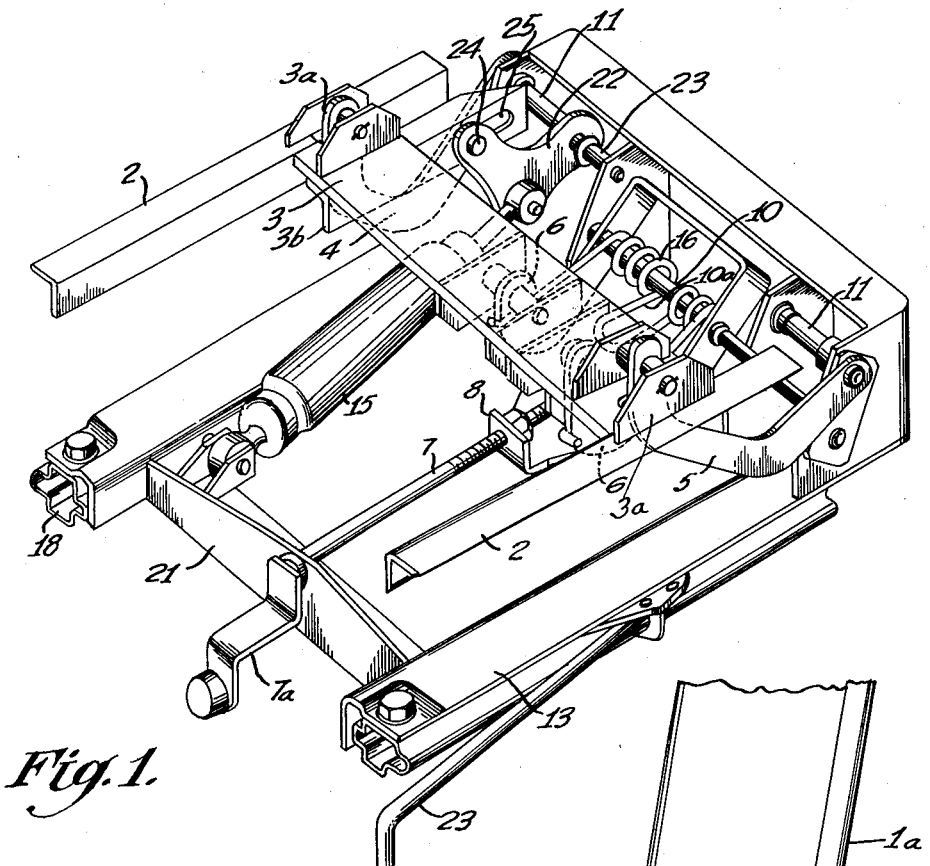
Fig. 1 is a perspective view showing a vehicle seat mounting, embodying the principles of the present invention, with the vehicle seat removed in order to more clearly illustrate the parts of the adjustable mounting.
Figure 2:
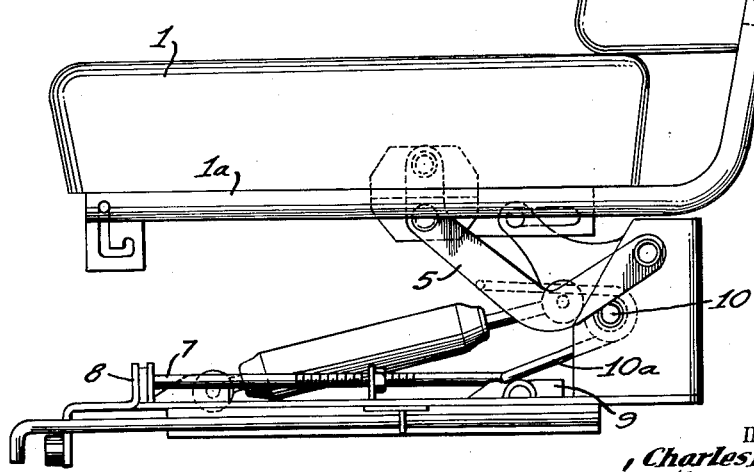
Fig. 2 is a side view and Fig. 3 is a front view of the seat mounting shown in Fig. 1, but with the seat shown mounted thereon.
Figure 3:
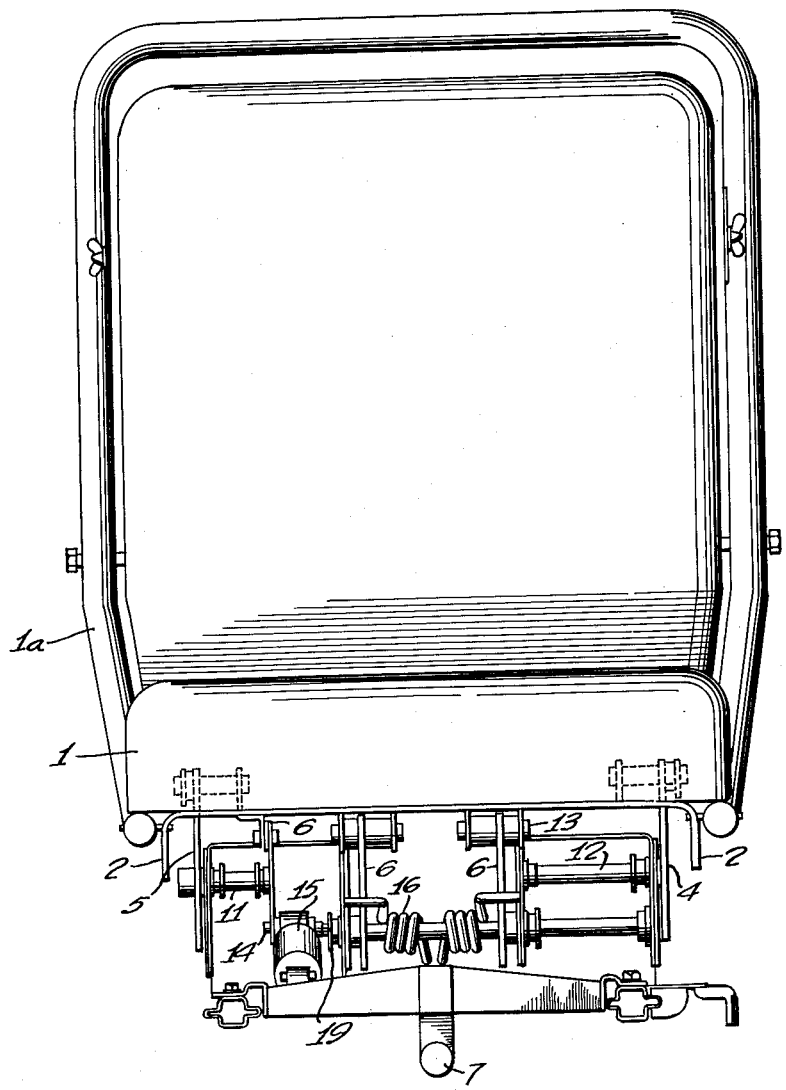

Referring more particularly to Figs. 1, 2 and 3 of the drawing, numeral 1 denotes a seat of conventional type for vehicles, either inner spring or foam rubber or other conventional construction, including a rear and bottom portion mounted on a frame, illustrated for purposes of example as being a tubular frame 1a.

The seat 1 is rigidly mounted on a pair of frames 2 which is rigidly fastened a cross member or plate 3 which carries bearings 3a, fastened thereto. Links or arms 4 and 5 have one end pivotally mounted on bearings 3a and the other end pivotally mounted on shafts 11 to guide the seat in its vertical movement and provide parallel motion thereto.

Cross frame 3 together with the frames 2 and the seat are adapted to move vertically downwardly, as the result of vehicle jolts, and to be yieldably resisted by the action of torsion spring 16. The torsion spring 16 is of spring steel and is helically wound about a shaft 10. The central portion 10a or stationary arm of the spring 16 is in the form of a loop which is secured to a slide element 8. Instead of a loop 10a, straight end portions similar to 34 in Fig. 4 may be provided. Slide element 8 is adapted to be slid longitudinally by means of a screw threaded shaft 7, which may be turned by means of a handle 7a, so that the threaded portion of the shaft 7, by engaging a threaded hole portion in bracket element 8, will effect longitudinal movement of slide element 8 in a range of perhaps a few inches.

The effect of rotating shaft 7 and reciprocaitng the element 8 is to move and change the angle of the stationary arm 10a of the torsion spring 16 about the axis of its coils as a center so as to change the tension of the spring. The extreme ends of spring 16 are hooked and the hooked portions lie against the bottom portions of levers 6, as illustrated more clearly in Figs. 1 and 3, which ends of the spring may be considered as the movable or active end portions. Thus, when the seat is pushed downwardly as the result of a jolt of the vehicle and weight of the driver, the free ends of the spring which engage levers 6 move downwardly so as to tension the spring 16 further.

By suitably cranking lever 7a in one direction or the other, the tension of the spring for normal loading may be either increased or decreased so as to provide either "harder" or a "softer" ride for the driver to adapt the seat for different weights of drivers and to the desired cushioning characteristics.

More specifically, as handle 7a is rotated so as to rotate shaft 7 journaled in the stationary cross frame 21, slide element 8 will be moved so as to carry with it slide roller 9 and the relatively stationary arm 10a of the torsion spring so as to change the angle of such arm and the degree of tension of the spring, to selectively provide either a softer or harder ride as desired.

The seat, together with the vertical movable frames 2 and 3, is adapted to yield and move downwardly a considerable distance—that is, almost to the same level as the stationary tracks 18, when the vehicle is jolted. This downward movement is resisted or cushioned not only by the tension of spring 16 but by the shock absorber 15, which has one end connected to the stationary frame 21 and the other end pivotally connected to a lever 22 which is pivotally mounted on shaft 23 journaled on stationary poritons of the base frame. Pin 24 extends from lever 22 into a slot 25 formed in a flanged portion of angle iron 3b rigidly secured to frame 2 so that upon vertical movement of the seat and cross member 3, pin 24 will slide in the slot.

The seat and seat base are mounted so as to be adjustably slidable as a unit on stationary tracks 17 and 18 to provide adjustment for different leg sizes of drivers. Slidable members 13 and 14 are slidably mounted on the tracks 17 and 18 and may be held in any desired fixed position by operating an adjusting lever 23 so that upon movement of the lever 23 in one direction, slidable members 13 and 14 are freely slidable on the tracks, and by moving the lever in an opposite direction, there is clutching engagement between the slidable members and tracks so as to hold these parts together rigidly in the selected position. Limit stops are provided for limiting the downward motion as well as the upward motion of the seat.

Figure 4:
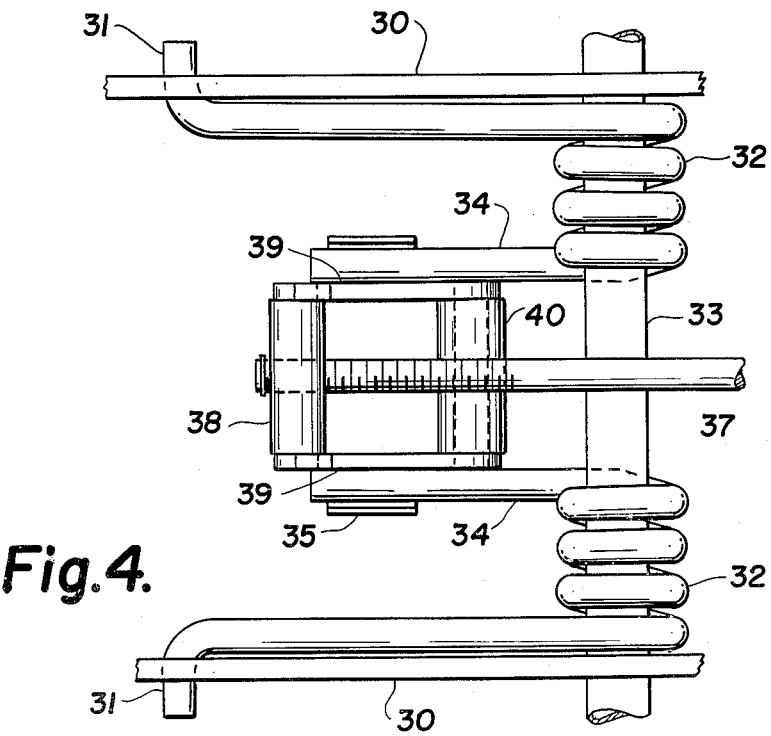
Fig. 4 is a plan view and Fig. 5, a side view of a modified form of torsion spring adjustment.
Figure 5:
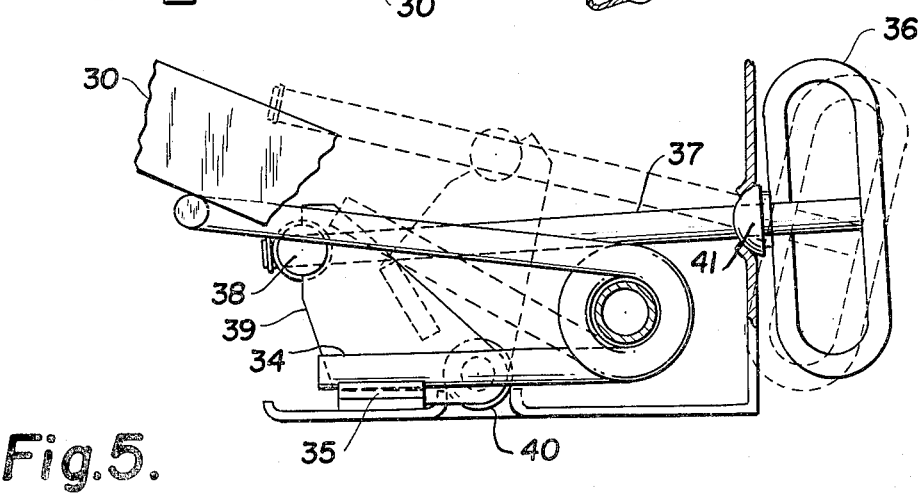

Figs. 4 and 5 show a modification of the suspension spring adjustment—Fig. 5 showing the parts in the no load and full load positions. The ends 31 of a pair of springs 32 are turned outwardly so as to rest against levers 30, 30. The other ends 34 of the springs rest in cradles 35 attached to pivotally movable brackets 39.

By turning handle 36 clockwise so that the hemispherical bearing 1 rigidly secured thereto turns in its seat, rod 37 will be turned and, by virtue of its screw threaded end portion which engages an internally threaded portion in the pin 38, the bracket 39, 39 will pivot about pin 40 as a center and will move from the full line position to the dotted line position shown in Fig. 5. Thus, the greater the amount of turning of handle 36, the greater will be the angle of rotation of bracket 39, 39, and the greater will be the tension applied to springs 32.

Thus it will be seen that we have provided an efficient vehicle seat suspension for passenger cars, trucks, tractors and the like, in which the seat is suspended by an easily and quickly adjustable torsion spring, to enable selective control of the tension of the torsion spring, and which will give parallel motion to the suspended seat without lateral or fore and aft motion to the seat frame; furthermore, we have also provided, in addition, a seat incorporating a further adjustment for moving the entire seat assembly forwardly or rearwardly for accommodating different size drivers.

While we have illustrated and described several specific embodiments of our invention, it will be understood that these are by way of illustration only, and that various changes and modifications may be made within the contemplation of our invention and within the scope of the following claim.

We claim:

In combination with a vehicle seat, a stationary base frame, a horizontal shaft mounted on said frame, a torsion spring helically wound about said shaft and having an extension, a carriage element to which said extension is secured, manually operated means for reciprocating said carriage for adjusting the angle of said extension, a vertically movable frame connected to said seat, lever means connected between terminal portions of said springs and said extension so that said vertically downward movements of the said seat resulting from vehicle jolts will be resisted by the tension of said torsion spring and whereby adjustable movements of said carriage will adjust the softness or hardness of the spring suspension, a shock absorber connected between said base frame and said movable frame for cushioning vertical movements of said movable frame, a flanged element having a slot and rigidly secured to said movable frame, a lever pivotally secured to one end of said shock absorber and being pivotally mounted on said stationary frame and having a pin at the end of one arm thereof which rides in said slot, and a pair of arms, one on each side of said stationary base frame, each having one end pivotally mounted on said base frame and the other end pivotally secured to said movable frame so as to guide said seat for parallel vertical movement.

References Cited in the file of this patent

UNITED STATES PATENTS

| | | |
|---|---|---|
| 2,558,049 | Hersey | June 26, 1951 |
| 2,588,638 | Krotz | Mar. 11, 1952 |
| 2,916,082 | Wilkinson et al. | Dec. 8, 1959 |

FOREIGN PATENTS

| | | |
|---|---|---|
| 42,243 | France | Mar. 21, 1933 |
| 477,965 | Italy | Feb. 11, 1953 |